UNITED STATES PATENT OFFICE.

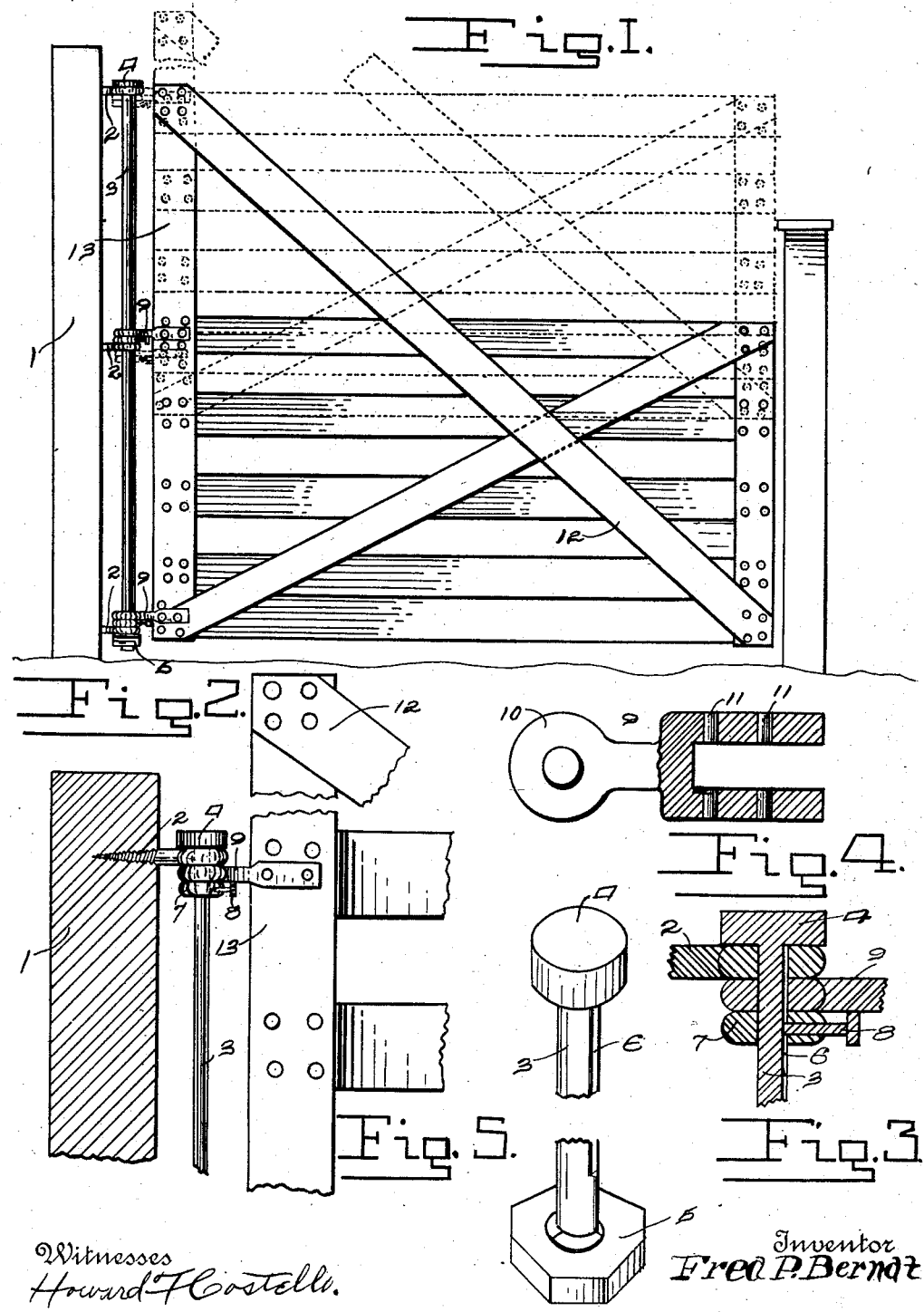

FRED P. BERNDT, OF LANCASTER, WISCONSIN.

GATE-HANGER.

992,637.  Specification of Letters Patent.  Patented May 16, 1911.

Application filed November 21, 1910. Serial No. 593,522.

*To all whom it may concern:*

Be it known that I, FRED P. BERNDT, a citizen of the United States, residing at Lancaster, in the county of Grant and State of Wisconsin, have invented certain new and useful Improvements in Gate-Hangers, of which the following is a specification, reference being had therein to the accompanying drawing.

This invention relates to gates and the principal object of the same is to provide means whereby a gate may be adjusted vertically in case the gate sags and in case of heavy snow so as to cause it to clear the ground. This is accomplished by having a vertical rod on which the gate is pivoted and having the gate supported on a pair of collars which may be adjusted vertically on the rod, thus raising and lowering the gate as desired.

This invention is illustrated in the accompanying drawings, wherein:

Figure 1 is a view of a gate mounted in the improved manner. Fig. 2 is a fragmental view of the gate showing how the same is mounted, the post being shown in section. Fig. 3 is a sectional view through the improved hinge device. Fig. 4 is a view partly in section of the hinge member which is attached to the gate. Fig. 5 is a view of the bolt and nut holding the rod in place.

Referring to the accompanying drawings by numerals:—(1) indicates an end post in which screw eyes 2 are secured. In the preferred form there are three of these eyes, the central screw being about the height of the gate when it is in lowered position. A rod 3 having an enlarged head 4 is passed through the eyes and is held in place by means of a nut 5 placed on its lower end. The rod 3 is provided with a longitudinally extending groove 6 and a pair of collars 7 are mounted upon the rod 3 one above each of the lower and central eyes and are provided with set screws 8 to hold them in a desired place upon the rod. A pair of hinge ears 9 are provided at one end with an eye 10 through which the rod passes and the other end is bifurcated and provided with alined openings 11 for the passage of bolts. The hinge ears are placed upon the rod 3 above the collar 7.

A gate of any desired type is fastened within the bifurcated end of the hinge ears 9, and is secured by means of bolts which pass through the openings 7. In the illustrated form the gate is of the type in which there is provided a plurality of longitudinal bars, the ends of which are secured to end braces and which is also provided with the diagonal brace. The gate is also provided with a second diagonal brace 12 which is secured to the lower front end and extends upwardly and rearwardly to a point approximately twice the height of the gate where it is secured to the upper end of an elongated rear brace 13. The gate proper is in height approximately half the length of the rod 3.

When the gate is set up the hinge ears 9 rest upon the collars 7 and when it is desired to rest the gate so as to clear the ground or to raise the gate above the level of a heavy snow the gate is raised and the collars raised to the height desired, and secured into place by turning the set screw 8 into the slot 6 which tightly holds the collars in place.

By having the gate provided with the brace 12 there is provided a rearwardly exerting pressure which prevents the gate from having any forward sag which would cause it to come into contact with the ground and thereby cause the gate to work hard or become twisted out of shape.

This gate is very convenient in countries where there are heavy snows in the winter and is also convenient for stock raisers where it is desired to permit small animals such for instance as pigs to pass from one field to another, but where it is desired to prevent larger animals such as cows and horses from getting into the next field.

Having described my invention what I claim is:

A device of the character described comprising a rod having an enlarged head and being provided with a longitudinally extending slot, screw eyes mounted upon said rod, collars mounted upon said rod above said screw eyes, set screws for said collars adapted to be engaged within said slot to hold said collars in a desired position upon said rod, and hinge ears pivotally mounted upon said rod above said collars.

In testimony whereof I hereunto affix my signature in presence of two witnesses.

FRED P. BERNDT.

Witnesses:
LEWIS E. HENKEL,
FANNIE JOHNSON.

Copies of this patent may be obtained for five cents each, by addressing the "Commissioner of Patents, Washington, D. C."